United States Patent [19]
Vaphiadis

[11] Patent Number: 5,316,273
[45] Date of Patent: May 31, 1994

[54] COUNTERBALANCE ACTUATOR HAVING AN EXTENDED STROKE

[75] Inventor: John L. Vaphiadis, Birmingham, Mich.

[73] Assignee: Litton Industrial Automation Systems, Inc., Warren, Mich.

[21] Appl. No.: 23,164

[22] Filed: Feb. 22, 1993

Related U.S. Application Data

[63] Continuation of Ser. No. 809,014, Dec. 17, 1991, abandoned.

[51] Int. Cl.⁵ .................................................. F16F 9/05
[52] U.S. Cl. .......................... 267/64.24; 267/64.19; 92/98 D
[58] Field of Search .............. 267/64.21, 64.24, 64.23, 267/64.27, 119, 122, 130, 64.19; 92/99, 98 D

[56] References Cited

U.S. PATENT DOCUMENTS

| | | | |
|---|---|---|---|
| 1,414,835 | 5/1922 | Spohrer | 92/99 |
| 2,773,686 | 12/1956 | Nash | 267/64.23 |
| 3,037,803 | 6/1962 | Phillips | 294/82.16 |
| 3,078,086 | 2/1963 | Bank | 267/64.24 |
| 3,385,590 | 5/1968 | Avner | 267/64.24 |
| 3,439,913 | 4/1969 | Kamman | 267/64.24 |
| 3,730,473 | 5/1973 | Pepi | 248/558 |
| 3,788,628 | 1/1974 | Hotz, Jr. et al. | 267/64.24 |
| 3,989,232 | 11/1976 | Steinbach et al. | 267/117 |
| 4,022,448 | 5/1977 | Reeder | 267/64.24 |
| 4,564,177 | 1/1986 | Leonard | 267/64.24 |
| 4,600,095 | 7/1986 | Brems et al. | 198/346.2 |
| 4,643,407 | 2/1987 | Zirk | 267/64.27 |
| 4,669,710 | 6/1987 | Horvat | 267/64.21 |
| 4,718,649 | 1/1988 | Pohlmann et al. | 267/64.24 |
| 4,825,681 | 5/1989 | Smedberg et al. | 72/453.13 |
| 4,844,428 | 7/1989 | Margolis et al. | 267/64.24 |
| 4,844,429 | 7/1989 | Eckman | 267/64.24 |
| 4,854,555 | 8/1989 | Ohkawa et al. | 267/64.24 |
| 5,129,634 | 7/1992 | Harris | 267/64.24 |

OTHER PUBLICATIONS

Firestone Airstroke ® Actuator Engineering Manual & Design Catalog #DKM-86A.

Primary Examiner—Robert J. Oberleitner
Assistant Examiner—Chris Schwartz
Attorney, Agent, or Firm—Michael H. Wallach

[57] ABSTRACT

A counterbalance actuator is disclosed for reducing the energy required in weight lifting operations. The counterbalance actuator includes a piston and a flexible bellows attached to the piston. A bellows extension is attached to the top of the bellows with a gas impervious seal. The bellows extension permits the counterbalance actuator to achieve an extended stroke while allowing the counterbalance actuator to be collapsed to a reduced size.

8 Claims, 2 Drawing Sheets

COUNTERBALANCE ACTUATOR HAVING AN EXTENDED STROKE

This is a continuation of copending application Ser. No. 07/809,014 filed on Dec. 17, 1991, now abandoned.

BACKGROUND OF THE INVENTION

1. Field of the Invention

This invention relates to gas actuated air springs in general, and more particularly to air springs having an enhanced stroke capability for use as a counterbalance device.

2. Summary of the Prior Art

Counterbalance devices are used in weight lifting operations to oppose the load due to gravity. For example, U.S. Pat. No. 4,600,095 of Jul. 15, 1986, the teachings of which are incorporated herein by reference, shows a mechanical press which has an elevated welding station. A lift mechanism is disposed below a conveyor passing beneath the welding station. The lift mechanism is designed to elevate a platen with a straight line vertical motion to place a workpiece carried to the station on the conveyor into contact with the welding guns in the welding station. In such operation, the lift mechanism used to move the platen to place the workpiece in contact with the welding guns must accelerate to a relatively high velocity and then decrease to a near zero velocity at the end of each multiple stage stroke so that the workpiece is gently engaged against the welding guns, and thereafter gently deposited back on the conveyor. The workpiece may be raised and lowered through a distance of approximately 24 inches at a relatively rapid rate of one to two seconds. A counterbalance is used to reduce, usually by 85 percent or more, the power required to rapidly move the load which, without a counterbalance, would require substantially increased energy. One form of counterbalance frequently utilized is an air spring, which is comprised of a flexible rubber/fabric bellows having a column of compressed air within the bellows. The air spring provides a source of potential energy which may be utilized to counteract gravity acting on the platen. The platen may be moved toward and away from the work station, for example toward and away from the welding guns, by a lift mechanism such as that described in the aforementioned U.S. Pat. No. 4,600,095.

Air springs which have found use in such applications are manufactured, for example, by Firestone Industrial Products Co., of Noblesville, Ind. Typical commercially available air springs have a useful stroke of approximately three to eighteen inches. When an extended stroke is required, the air springs must be stacked on top of one another to increase the stroke without degrading their weight carrying ability. However, the foregoing arrangement requires that the stacked air springs be joined together by a center plate, for example, in the manner shown on page sixteen of the Firestone catalog number DKM-86A or in U.S. Pat. No. 4,825,681. Additionally, the plates connecting the air springs may be required to be guided by the use of vertical bars or rails, to insure accurate vertical motion of the plates connecting the air springs together. While the guidance rods used in stacked air spring applications help maintain stability, they require additional components and accurate alignment to insure that the stroke provided by the stacked air springs operate in a vertical column. Additionally, in some applications, it is impractical to use vertical guide bars due to space limitations. Finally, stacked air springs may simply not provide a relatively constant force over an extended travel distance required for some industrial applications.

Another possible way of increasing the stroke of an air spring is to increase the vertical height of the rubber/fabric bellows. However, bellows having substantially larger vertical dimensions can become slender and unstable with respect to its diameter, thereby risking catastrophic failure due to buckling. Also, increasing the vertical height of the rubber/fabric bellows often exceeds the capacities of existing forming equipment. New equipment to extend capacities is prohibitively expensive for all but the highest volume applications. Consequently, there is a need to increase the stroke of an air spring or counterbalance actuator while not adversely affecting the costs or mechanical stability.

SUMMARY OF THE INVENTION

A principal object of the disclosed invention is to provide a counterbalance actuator having an extended stroke while being able to provide sufficient potential energy for use in industrial manufacturing applications and, in particular, in automotive or truck assembly applications.

Still another object of the invention is to provide a counterbalance actuator having an extended stroke capability which can be easily manufactured using existing bellows forming equipment.

Another object of the invention is to provide a counterbalance actuator having an extended stroke capability which can fit in the space occupied by an air spring with a smaller overall vertical stroke.

The above and other objects, features and advantages of the invention are achieved by an air spring having an extended length. The lower end of a flexible bellows is fastened with an airtight seal to a rigid first chamber casing to allow air to be trapped under pressure within the chamber casing and bellows combination and retained therein. The upper end of the flexible bellows is fastened to a second extension chamber casing which is comprised of a rigid tube having a stiff wall and an end plate. The lower end of the extension chamber casing is open and is sealingly attached to the top end of the flexible bellows to provide an airtight seal between the extension chamber casing and the bellows. The diameter of the extension chamber casing is made sufficiently greater than the diameter of the first chamber casing to permit the extension chamber casing to fit around the first chamber casing when air is bled out of the bellows and to allow the flexible wall of the bellows to reside between wall of the first chamber casing and the wall of the extension chamber casing. The first chamber casing; extension chamber casing and flexible bellows thereby exhibit a "telescoping effect" when air is removed from the bellows to allow the extension chamber casing to collapse onto the first chamber casing.

BRIEF DESCRIPTION OF THE DRAWINGS

The above objects and other advantages of the invention will be appreciated after review of the detailed description of a preferred embodiment when read in conjunction with the drawing in which.

DETAILED DESCRIPTION OF A PREFERRED EMBODIMENT

Figure 1:
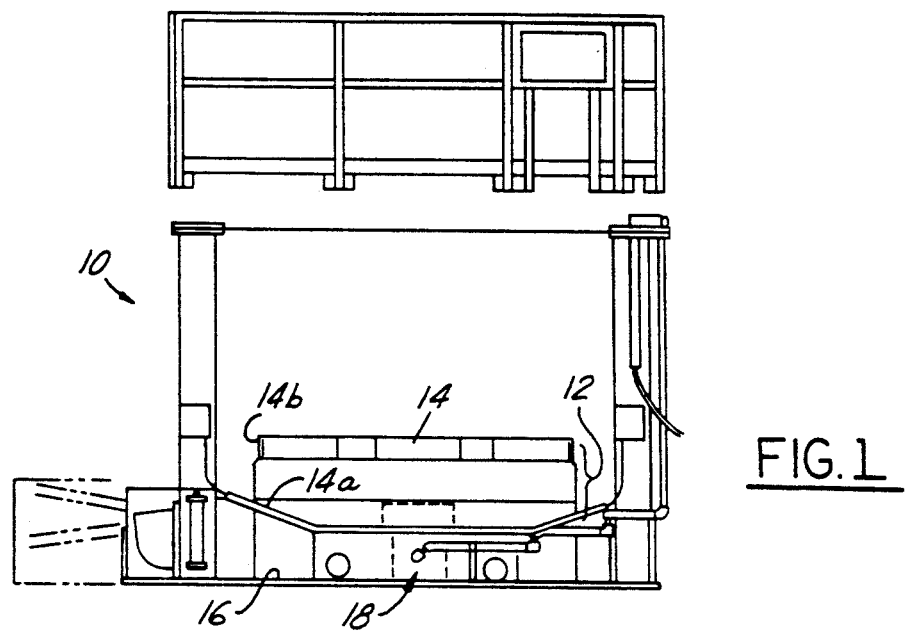
FIG. 1 is a side view of a lift mechanism having a platen whose vertical motion may be augmented by one or more counterbalance actuators constructed in accordance with the teachings of the disclosed invention.

Referring to the drawing, FIG. 1 shows a welding press 10 to which the disclosed invention may be advantageously applied. The welding press 10 includes a lifting table 12 having a platen 14 (shown in raised and lowered positions) for supporting a workpiece. Welding guns and tooling (not shown) may be secured on and above the platen 14 to perform welding operations on a workpiece (not shown) that is moved onto the platen 14 in a manner well known in the field of assembling automobiles or other large components. A lifting mechanism 15 (partially shown in FIG. 3) such as that disclosed in U.S. Pat. No. 4,600,095 may be disposed beneath the lifting table 12 to move the platen 14 in a vertical motion toward and away from the welding guns supported above the table. As those skilled in the art of manufacturing equipment for the assembly of large, complex objects (for example, automobiles) will appreciate, the platen and load carried by it (including any tooling used to accurately locate the load on the platen with respect to the welding guns) can be of substantial weight, for example, it is not unusual for such a mechanism together with the load and fixturing to weigh between five and twenty-five thousand pounds. The energy required by the lift mechanism to move the platen and its load may be substantially decreased by utilizing one or more counterbalance actuators placed between the platen 14 and the floor 16 to counteract the force of gravity and reduce the energy required to move the platen 14 and its associated load.

Figure 2:
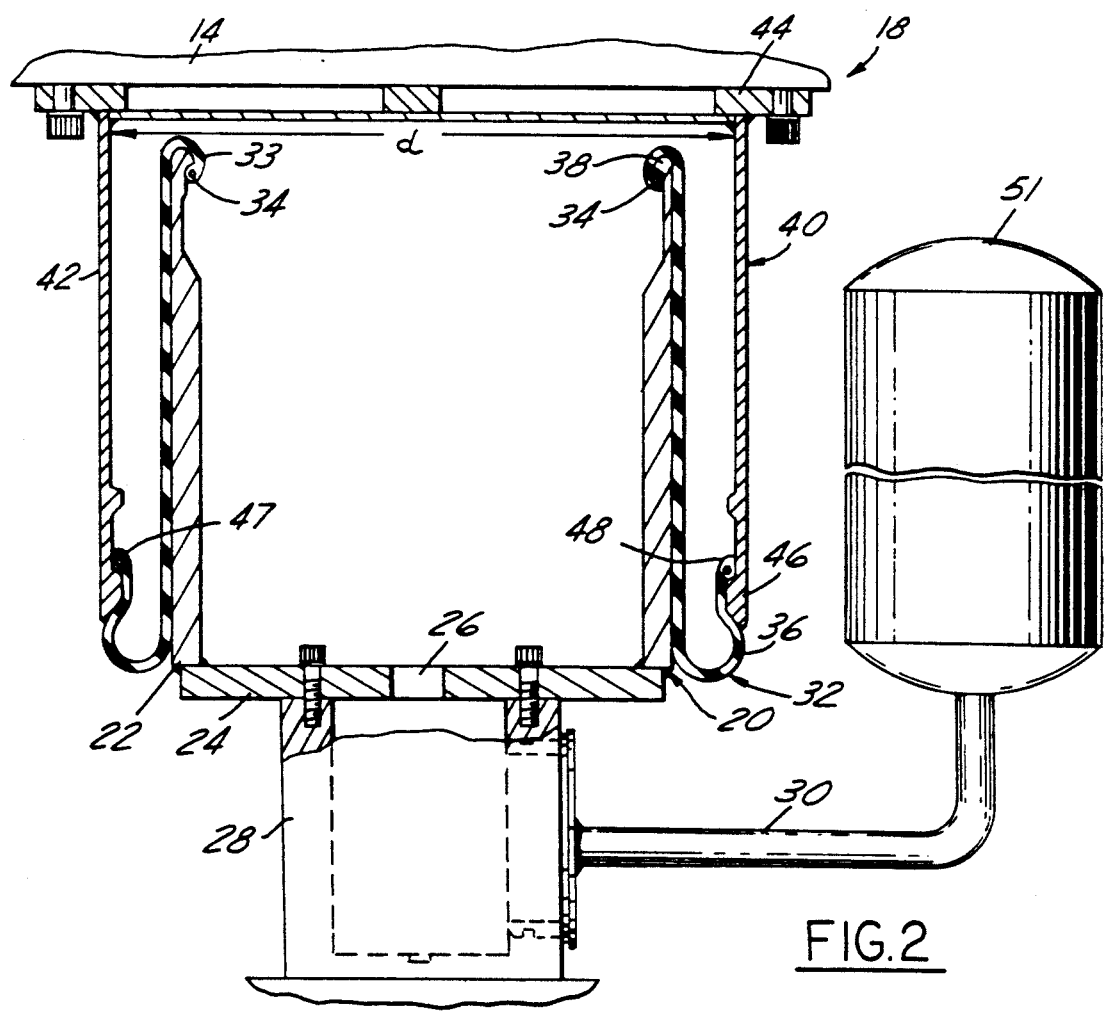
FIG. 2 is a side view in section showing a preferred embodiment of a counterbalance actuator constructed in accordance with the teachings of the invention.

FIG. 2 shows a preferred embodiment of a counterbalance actuator 18 constructed in accordance with the teachings of the invention. Counterbalance actuator 18, includes a first lower rigid chamber casing 20 which, in the preferred embodiment shown, includes a circular casing wall 22. Casing wall 22 is connected to a base plate 24 which contains an orifice 26. Base plate 24 has fastened thereto a manifold 28 which permits air to be pumped into the counterbalance actuator 18 from a pipe 30. The counterbalance actuator 18 also includes a flexible bellows 32 constructed of a flexible material which will retain air under pressure, for example constructed from a rubber/fabric combination. Bellows 32 has a lower end 33 which is circular in shape and which contains a circular wire spring 34 to permit the wall 36 of the bellows to be retained to wall 22 of the lower casing with an air-tight seal having the wall 36 forced against a mating bead 38 on the upper extremity of casing wall 22 in a manner similar to that in which a tubeless tire is retained to a tire rim.

The counterbalance actuator also includes a casing or second upper rigid chamber 40 which is comprised of a side wall 42 and an end closure plate 44. The diameter "d" of the upper extension chamber casing is made sufficiently large so that it can easily slip over the lower chamber casing 20 and accommodate the wall 36 of the bellows 32 when the upper extension chamber casing is collapsed around the lower chamber casing 20. Side wall 42 of upper extension chamber casing 40 also includes a bead 46 at the lower extremity of the side wall 42 to receive and retain an end 47 of the wall 36 of the bellows 32. Preferably a circular wire spring 48 is embedded in the end 47 of the side wall 32 of the bellows 36 to engage the bead 46 of side wall 42 and to be retained against the side wall 42 in the same manner as the lower extremity of side wall 36 of the bellows is retained against the upper extremity of wall 22 of the lower chamber casing 20.

Figure 3:
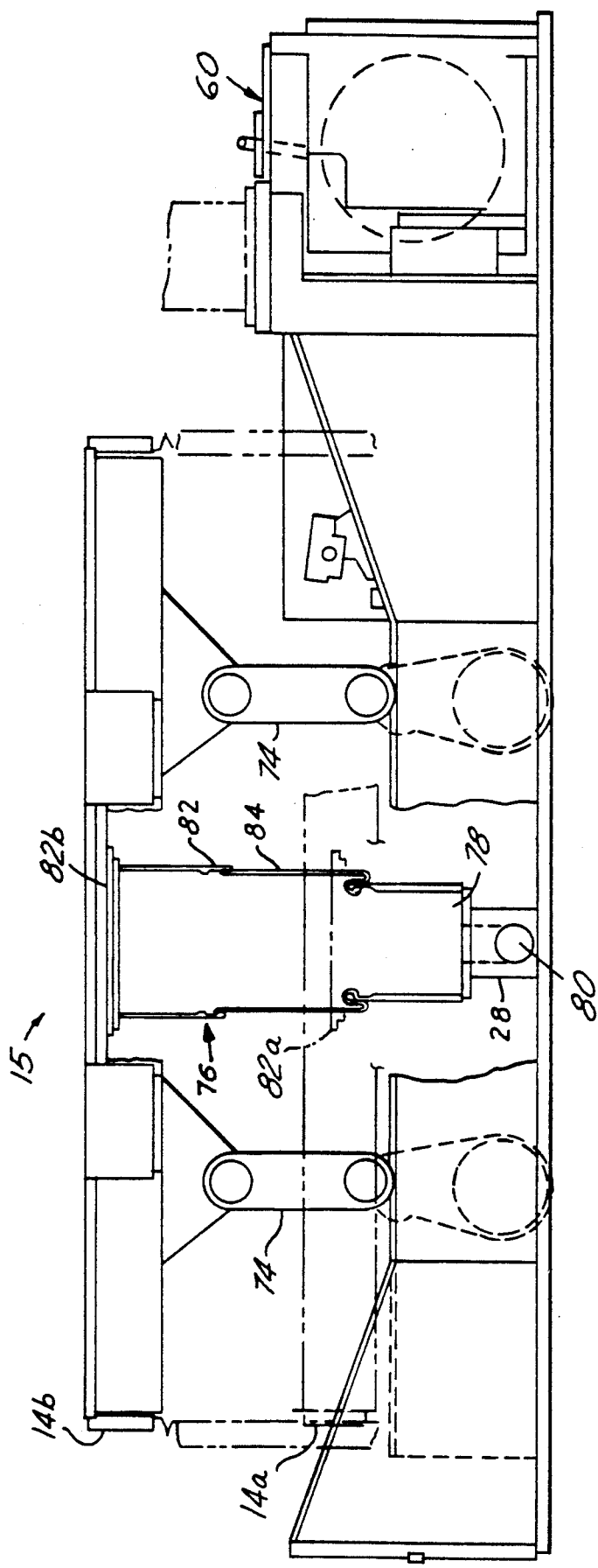
FIG. 3 is a side view of a lift mechanism similar to that show in FIG. 1 showing the counterbalance actuator positioned beneath a platen and the lift mechanism used to move the platen from a lowered position to a raised position.

The lower casing 20, bellows 32 and upper extension casing 40 form an air tight chamber which, when pressurized with air or another gas, for example, at pressures of up to 100 psi, causes an extension of the counterbalance actuator 18 from the collapsed condition shown in FIG. 2 to a condition shown in FIG. 3 where the fully extended bellows permits the upper extension casing 40 to be fully extended above the lower casing 20.

Each counterbalance actuator 18 used to counterbalance the weight or effect of gravity on the moveable platen 14 is connected via a pipe 28 and manifold 30 to one or more pressurized air accumulators or surge tanks 51 having a fixed volume. The accumulators have sufficient volume so that as the platen 14 is moved up and down, thereby causing a cyclical change in the air pressure in the counterbalance actuator 18, the pressure of the air contained in the system does not change dramatically due to variations in the effective volume of the combination of the accumulators and the counterbalance actuators connected thereto. For example, the volume of the accumulators should be ten or more times the volume of the counterbalance actuator connected to it. In addition, a source of makeup air may also be connected to the accumulators and counterbalance actuators through an air pressure regulating device to provide a source of additional air to replace any air which may leak from the system, for example from the seals between the upper extension casing 36 and the bellows 28 or the seal between the lower casing 20 and the bellows 32 or from pipe joints in the system.

FIG. 3 shows a lift mechanism 15 for the press to which the teachings of the invention may be applied. Platen 14 may be moved from its lower position, for example position 14a, to its raised position, for example 14b, by the use of a cycloidal drive mechanism 60 which provides a cycloidal motion to a pair of linkages 74. The cycloidal mechanism controls motions of the linkages 74 as taught by U.S. Pat. No. 4,075,911 which is owned by the owner of the present invention, and the teachings of which are incorporated herein by reference. Counterbalance actuator 76 includes a lower casing 78 which is connected to an air accumulator (not shown) through an air inlet 80 to provide a constant pressurized supply of air for the accumulator 76. The lower casing 78 of the counterbalance actuator is rigidly fastened to the base of the lift mechanism while the upper extension casing 82 is fastened to the platen 14. The counterbalance actuator 76 may have a stroke of approximately 24 inches to support motion of the platen through a travel distance of 24 inches from its lowered to its raised position. As shown in position 82a the upper extension casing 82 may assume a retracted position roughly telescoped over the lower casing 78 when the platen 14 is lowered by the cycloidal drive mechanism. The counterbalance actuator will assume the extended position 82b when the drive mechanism moves the platen 14 to the position 14b. Construction of the counterbalance actuator with a upper extension casing 82 as shown in FIG. 3 permits an extended stroke without requiring an excessively long bellows 84, while still permitting the counterbalance actuator to augment the vertical motion imparted to the platen by the lift mechanism 15.

While a preferred embodiment of the invention has been shown, other variations in the invention may become evident to those skilled in the art as a result of the disclosure contained herein. For example, more than one counterbalance actuator could be used to counteract the force of gravity or inertial forces in applications where a heavy load must be supported or moved rapidly. Furthermore, while the invention has been shown as applied to a lift mechanism for use in a welding operation, it could also have advantages for other uses, for example in stamping presses. It is not intended that the invention be limited to the details herein recited, the intention being that the invention be limited only by the permissible scope of interpretation of the claims appended hereto.

I claim:

1. A lift mechanism comprising, a base, a platen carried by said base, a drive operably connected with said platen for moving said platen generally vertically from a first fully lowered position to a second fully raised position relative said base, a counterbalance actuator carried by said base and operably connected with said platen to bear at least part of the weight of objects carried by said platen, said counterbalance actuator having a first casing having a rigid side wall, a closed end, and an open end and defining in part an enclosed space receiving gas under pressure, a second casing having a rigid side wall, a closed end and an open end and defining in part an enclosed space for receiving gas under pressure, a single bellows having a flexible side wall and spaced apart open ends with one of said open ends being connected with a substantially gas impervious seal to said side wall of said first casing adjacent the open end thereof and the other of said open ends of said bellows being connected with a substantially gas impervious seal to said side wall of said second casing, a port communicating with said first casing for admitting gas under pressure to an expansible chamber defined by said casings and said bellows, and an accumulator chamber communicating with said port and having a volume at least ten times greater than the minimum volume of said expansible chamber defined by said casings and said bellows, said side wall of one of said casings having a sufficiently larger diameter than said side wall of the other of said casings so that in said first lowered position of said platen said side walls are telescoped one within the other with at least part of said side wall of said bellows received between them and in the second fully raised position of said platen said casings are axially spaced apart with said bellows extending between them so that the length of the maximum stroke of the platen between said first and second positions is greater than the maximum axial length of said flexible bellows, there is no structure within said casings aligning or guiding them for generally axial movement between said lowered and raised positions of said platen, and in said fully raised position of said platen said side wall of said bellows is not laterally restrained other than by connection of said ends thereof with said casings.

2. The lift mechanism of claim 1 wherein said side walls of said casings are generally cylindrical in shape.

3. The lift mechanism of claim 1 wherein said side wall of said bellows is a fabric reinforced rubber material.

4. The lift mechanism of claim 1 wherein the length of said flexible bellows is greater than the length of said side walls of both of said casings.

5. The lift mechanism of claim 1 wherein the length of said side wall of said flexible bellows is greater than the length of said side wall of said second casing.

6. The lift mechanism of claim 1 which also comprises at least one end of said side wall of said bellows having a circumferentially continuous bead received in a complementary bead seat on said side wall of one of said casings.

7. The lift mechanism of claim 1 wherein said side wall of said bellows also comprises a circumferentially continuous bead adjacent each end thereof and each side wall of each casing has a complementary bead seat in which one of said beads of said bellows is received.

8. The lift mechanism of claim 7 wherein the length of said side wall of said flexible bellows is greater than the length of said side wall of said second casing.

* * * * *